US010176500B1

(12) United States Patent
Mohan

(10) Patent No.: US 10,176,500 B1
(45) Date of Patent: Jan. 8, 2019

(54) CONTENT CLASSIFICATION BASED ON DATA RECOGNITION

(71) Applicant: A9.com, Inc., Palo Alto, CA (US)

(72) Inventor: Shrinivas Mohan, Sunnyvale, CA (US)

(73) Assignee: A9.COM, INC., Palo Alto ( * ) Notice: Subject to any disclaimer, the term of this patent is extended or adjusted under 35 U.S.C. 154(b) by 360 days.

(21) Appl. No.: 13/904,419

(22) Filed: May 29, 2013

(51) Int. Cl.

| | |
|---|---|
| G10L 21/00 | (2013.01) |
| G10L 25/00 | (2013.01) |
| G10L 15/00 | (2013.01) |
| G10L 15/06 | (2013.01) |
| G10L 15/04 | (2013.01) |
| G06K 9/72 | (2006.01) |
| G06K 9/54 | (2006.01) |
| G06K 9/46 | (2006.01) |
| G06K 9/18 | (2006.01) |
| G06K 9/66 | (2006.01) |
| G06K 9/34 | (2006.01) |
| G06K 9/00 | (2006.01) |
| G06Q 10/00 | (2012.01) |
| G06Q 30/00 | (2012.01) |
| G06F 7/00 | (2006.01) |
| G06F 17/00 | (2006.01) |
| G06F 17/30 | (2006.01) |
| G06F 15/16 | (2006.01) |
| G06Q 30/02 | (2012.01) |

(52) U.S. Cl.
CPC ................ *G06Q 30/0277* (2013.01)

(58) Field of Classification Search
CPC .............. G06K 9/72; G06F 17/30265; G06F 17/30067; G06F 17/30864; G06F 3/0481; H04L 29/08072

USPC ...... 382/229, 305; 704/9.275; 709/219, 217; 707/687, 730; 715/730
See application file for complete search history.

(56) References Cited

U.S. PATENT DOCUMENTS

| | | | | |
|---|---|---|---|---|
| 6,823,331 B1 * | 11/2004 | Abu-Hakima | .... | G06F 17/30707 707/758 |
| 6,829,582 B1 * | 12/2004 | Barsness | ........................ | 704/275 |
| 7,382,903 B2 * | 6/2008 | Ray | .................... | G06F 17/30256 382/115 |

(Continued)

FOREIGN PATENT DOCUMENTS

| | | | |
|---|---|---|---|
| GB | 002449742 A | * | 12/2008 |
| WO | WO002095527 A2 | * | 11/2002 |

*Primary Examiner* — Anne L Thomas-Homescu
(74) *Attorney, Agent, or Firm* — Hogan Lovells US LLP

(57) ABSTRACT

One or more content items can be received at a data recognition module. The data recognition module can utilize, individually or in any combination, image recognition (e.g., OCR, object recognition, etc.), audio recognition (e.g., speech recognition, music identification, etc.), and/or text recognition (e.g., text crawling) in order to identify or recognize at least a portion of the one or more content items. Based on the identified content portion(s), the one or more content items and/or their respective source(s) can be classified. In one example, an image containing a not yet machine-readable curse word can be included in a source webpage. The image can be received at the data recognition module. The curse word contained in the image can be recognized/identified using an OCR process. Based, at least in part, on the recognized/identified curse word, the image and/or the webpage can be classified as likely being associated with inappropriate material.

20 Claims, 9 Drawing Sheets

(56) References Cited

U.S. PATENT DOCUMENTS

| | | | | |
|---|---|---|---|---|
| 7,639,898 B1* | 12/2009 | Chan | | 382/305 |
| 7,751,592 B1* | 7/2010 | Rosenberg | | G06K 9/6293 382/112 |
| 7,836,061 B1* | 11/2010 | Zorky | | G06F 17/30707 707/749 |
| 7,978,882 B1* | 7/2011 | Rosenberg | | G06K 9/6293 382/112 |
| 9,009,256 B1* | 4/2015 | DeMorrow et al. | | 709/217 |
| 9,465,789 B1* | 10/2016 | Chen | | G06F 17/2217 |
| 2003/0014444 A1* | 1/2003 | Wu | | G06F 17/30867 715/209 |
| 2003/0041306 A1* | 2/2003 | Takahashi | | G06F 17/30011 715/209 |
| 2003/0118325 A1* | 6/2003 | Schrader | | 386/94 |
| 2003/0126267 A1* | 7/2003 | Gutta et al. | | 709/229 |
| 2004/0221062 A1* | 11/2004 | Starbuck | | G06Q 10/107 709/246 |
| 2005/0015454 A1* | 1/2005 | Goodman | | H04L 51/12 709/207 |
| 2005/0131868 A1* | 6/2005 | Lin | | G06F 17/30867 |
| 2005/0251399 A1* | 11/2005 | Agarwal et al. | | 705/1 |
| 2006/0047704 A1* | 3/2006 | Gopalakrishnan | | G06F 17/30247 |
| 2006/0047769 A1* | 3/2006 | Davis | | G06Q 10/107 709/207 |
| 2006/0062492 A1* | 3/2006 | Masuichi | | G06F 17/271 382/305 |
| 2006/0161534 A1* | 7/2006 | Carson et al. | | 707/3 |
| 2006/0184500 A1* | 8/2006 | Najork | | G06F 17/30864 |
| 2007/0133947 A1* | 6/2007 | Armitage | | G06F 17/30256 386/224 |
| 2008/0002916 A1* | 1/2008 | Vincent | | G06K 9/3258 382/305 |
| 2008/0131006 A1* | 6/2008 | Oliver | | G06K 9/00463 382/229 |
| 2008/0148147 A1* | 6/2008 | Poston | | G06F 17/30716 715/273 |
| 2008/0162528 A1* | 7/2008 | Jariwala | | G06F 17/241 |
| 2008/0183750 A1* | 7/2008 | Lee | | G06Q 10/10 |
| 2008/0184133 A1* | 7/2008 | Lee | | G06Q 30/02 715/751 |
| 2008/0270390 A1* | 10/2008 | Ward | | G06F 17/3053 |
| 2009/0144605 A1* | 6/2009 | Radakovic | | G06K 9/00469 715/200 |
| 2009/0222853 A1* | 9/2009 | White et al. | | 725/34 |
| 2010/0070350 A1* | 3/2010 | Paunikar | | G06Q 30/02 705/14.1 |
| 2010/0211551 A1* | 8/2010 | Ryu | | 707/687 |
| 2010/0316300 A1* | 12/2010 | Epshtein et al. | | 382/229 |
| 2011/0038512 A1* | 2/2011 | Petrou | | G06F 17/30256 382/118 |
| 2011/0106634 A1* | 5/2011 | Luttrell, Jr. | | G06Q 30/02 705/14.73 |
| 2011/0125735 A1* | 5/2011 | Petrou | | G06F 17/30277 707/723 |
| 2011/0213655 A1* | 9/2011 | Henkin et al. | | 705/14.49 |
| 2011/0274345 A1* | 11/2011 | Tuganbaev | | G06K 9/6292 382/159 |
| 2011/0311140 A1* | 12/2011 | Urbach | | G06K 9/00664 382/182 |
| 2012/0039539 A1* | 2/2012 | Boiman | | G11B 27/28 382/195 |
| 2012/0078908 A1* | 3/2012 | Djordjevic | | G06F 17/30253 707/737 |
| 2012/0106925 A1* | 5/2012 | Dirik | | H04N 5/147 386/240 |
| 2012/0128250 A1* | 5/2012 | Petrou | | G06F 17/30253 382/182 |
| 2012/0128251 A1* | 5/2012 | Petrou | | G06F 17/30253 382/182 |
| 2012/0134588 A1* | 5/2012 | Zhang | | G06K 9/3275 382/176 |
| 2012/0134589 A1* | 5/2012 | Reddy | | G06K 9/6255 382/182 |
| 2012/0134590 A1* | 5/2012 | Petrou | | G06F 17/30253 382/182 |
| 2012/0179787 A1* | 7/2012 | Walsh et al. | | 709/219 |
| 2012/0227104 A1* | 9/2012 | Sinha | | H04L 12/585 726/22 |
| 2012/0310937 A1* | 12/2012 | Stibel | | G06F 17/30864 707/737 |
| 2013/0047260 A1* | 2/2013 | Hoefel et al. | | 726/27 |
| 2013/0066863 A1* | 3/2013 | Rose | | 707/730 |
| 2013/0067334 A1* | 3/2013 | Rose | | 715/730 |
| 2013/0138428 A1* | 5/2013 | Chandramouli et al. | | 704/9 |
| 2013/0191469 A1* | 7/2013 | Dichiu | | H04L 63/0263 709/206 |
| 2014/0169678 A1* | 6/2014 | Chulinin | | G06K 9/46 382/195 |
| 2014/0229164 A1* | 8/2014 | Martens | | G06F 17/241 704/9 |
| 2014/0244405 A1* | 8/2014 | Cohen | | G06Q 30/0273 705/14.72 |
| 2015/0070516 A1* | 3/2015 | Shoemake et al. | | 348/207.11 |

* cited by examiner

CONTENT CLASSIFICATION BASED ON DATA RECOGNITION

BACKGROUND

Computing devices and computing platforms in networked environments are becoming more commonplace, are being used for a wider variety of purposes, and have an increasing amount of functionality. In one example, a computing device can enable a user to browse to a website. The website can have at least one page, and the at least one page can have a page area that is designated for displaying advertising content. An advertiser can pay the owner of the website for displaying the advertiser's advertisements at the page area. However, in some cases, the advertiser might not know what content the website, pages, or particular page areas are primarily associated with. If the website is primarily associated with offensive or obscene material, then the advertiser might not have decided to display its advertisement on that website. In another example, the computing device can be used to browse through products offered by an electronic marketplace. If an inappropriate product is offered by the marketplace, then the marketplace's reputation and/or sales might be affected negatively. In a further example, the computing device can enable a child user to navigate to a website or to run an application. If the child user navigates to an inappropriate website or runs an inappropriate application, then a parent of the child user might get upset. These and other concerns can reduce the overall user experience associated with using computing devices and computing platforms in networked environments.

BRIEF DESCRIPTION OF THE DRAWINGS

Various embodiments in accordance with the present disclosure will be described with reference to the drawings, in which.

DETAILED DESCRIPTION

Figure 1:
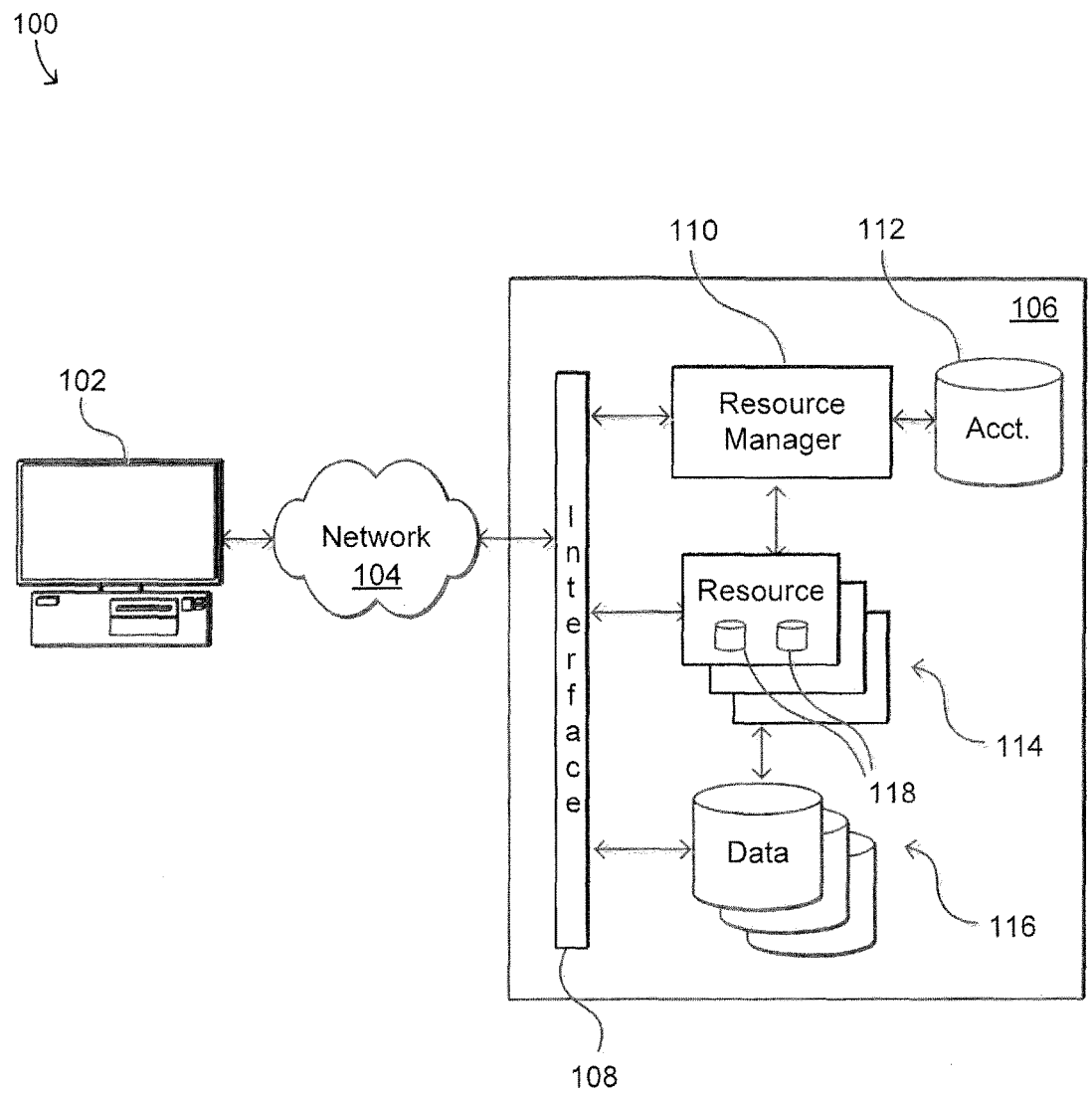
FIG. 1 illustrates an example environment in which aspects of the various embodiments can be utilized.

Systems and methods in accordance with various embodiments of the present disclosure overcome one or more of the above-referenced and other deficiencies in conventional approaches to content identification and/or classification. In particular, various embodiments of the present disclosure enable content to be classified based on image data recognition, audio data recognition, and/or text data recognition.

In some embodiments, the disclosed technology can enable one or more content items to be received at a data recognition module. The content items can be, for example, images, audio, and/or text. Videos can also be content items in that video content items are formed by a combination of video image frames and extracted audio. In some cases, the content items can be included with web content, such as a website (e.g., Internet webpage), information about a product (e.g., at an online marketplace), or an application (e.g., a mobile app downloaded from the Internet).

Various embodiments of the present disclosure can enable the data recognition module to identify at least portions of the received content items. In one example, text in an image content item can be identified or recognized by the data recognition module using an optical character recognition (OCR) process. In another example, the data recognition module, using a speech-to-text process, can identify one or more spoken words from an audio content item. In a further example, the data recognition module can use a text crawling process to identify at least some (machine-readable) text.

The identified content item portions can be received by a classifier unit. In some embodiments, the classifier unit can compare the identified content item portions with one or more pieces of defined data (i.e., one or more definitions). In some instances, the one or more pieces of defined data (i.e., one or more definitions) can be known, preset, pre-labeled, etc., as being associated with a form of inappropriate content (e.g., curse words, offensive vocalizations, explicit visual material, etc.). The classifier unit can attempt to find defined data (i.e., definitions) that substantially match the identified content item portions. If the identified content item portions have one or more substantially matching pieces of defined data known to be associated with inappropriate material, then the classifier unit can classify the content item and the source of the content item (e.g., website, product, application, web content, etc.) as likely being inappropriate as well.

In some embodiments, the disclosed technology can enable an advertisement management system to decide at which website(s) to display certain ads. In one example, the advertisement management system can utilize content classification based on data recognition to find websites that are relevant to the ads for display. In another example, the advertisement management system can utilize content classification based on data recognition to filter out websites that are inappropriate for displaying the ads.

In some embodiments, the disclosed technology can enable a publisher for an electronic marketplace to determine which products supplied by retailers should be published at the marketplace. For example, the publisher can receive product information that has been classified as being inappropriate, and can thus decide not to publish the product at the marketplace. In some embodiments, product information can include any information or data related to (or representative of) a product.

Furthermore, in some embodiments, the disclosed technology can operate as a content filter. For example, a parental control feature and/or a censorship feature can use the disclosed technology to determine which contents (e.g., websites, applications, images, movies, music, etc.) are allowable and/or accessible on a computing device (e.g., accessible via applications, software, and/or computer program code running on the computing device). Moreover, in some embodiments, the disclosed technology can be implemented for other use cases, including (but not limited to) social websites, entertainment websites, news websites, content ranking websites, and question-and-answer websites.

Various other functions and advantages are described and suggested below as may be provided in accordance with the various embodiments.

FIG. 1 illustrates an example environment 100 in which aspects of the various embodiments can be implemented. In this example a user is able to utilize a client computing device 102 to communicate across at least one network 104 with a resource provider environment 106. The client computing device (i.e., client device, client, etc.) can include any appropriate electronic device operable to send and receive requests, messages, or other such information over an appropriate network and convey information back to a user of the device. Examples of such client devices include personal computers, tablet computers, smart phones, notebook computers, and the like (see FIG. 7 and FIG. 8 for more details). The network(s) 104 can include any appropriate network, including an intranet, the Internet, a cellular network, a local area network (LAN), or any other such network or combination, and communication over the network can be enabled via wired and/or wireless connections. The resource provider environment 106 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users or applications for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example, the provider environment includes a plurality of resources 114 or one or more types. These types can include, for example, application servers operable to process instructions provided by a user or database servers operable to process data stored in one or more data stores 116 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, an application executing on the client device 102 that needs to access or utilize a portion of the resources 114, which might be exposed as one or more services to which the application has subscribed, can submit a request that is received to an interface layer 108 of the provider environment 106. The interface layer can include application programming interfaces (APIs) or other exposed interfaces enabling a user to submit requests, such as Web service requests, to the provider environment. The interface layer 108 in this example can also include other components as well, such as at least one Web server, routing components, load balancers, and the like. When a request to access a resource is received at the interface layer 108 in some embodiments, information for the request can be directed to a resource manager 110 or other such system, service, or component configured to manage user accounts and information, resource provisioning and usage, and other such aspects. A resource manager 110 receiving the request can perform tasks such as to authenticate an identity of the user submitting the request, as well as to deter nine whether that user has an existing account with the resource provider, where the account data may be stored in at least one data store 112 in the provider environment.

An interface layer 108 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshaling or un-marshaling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

Figure 2:
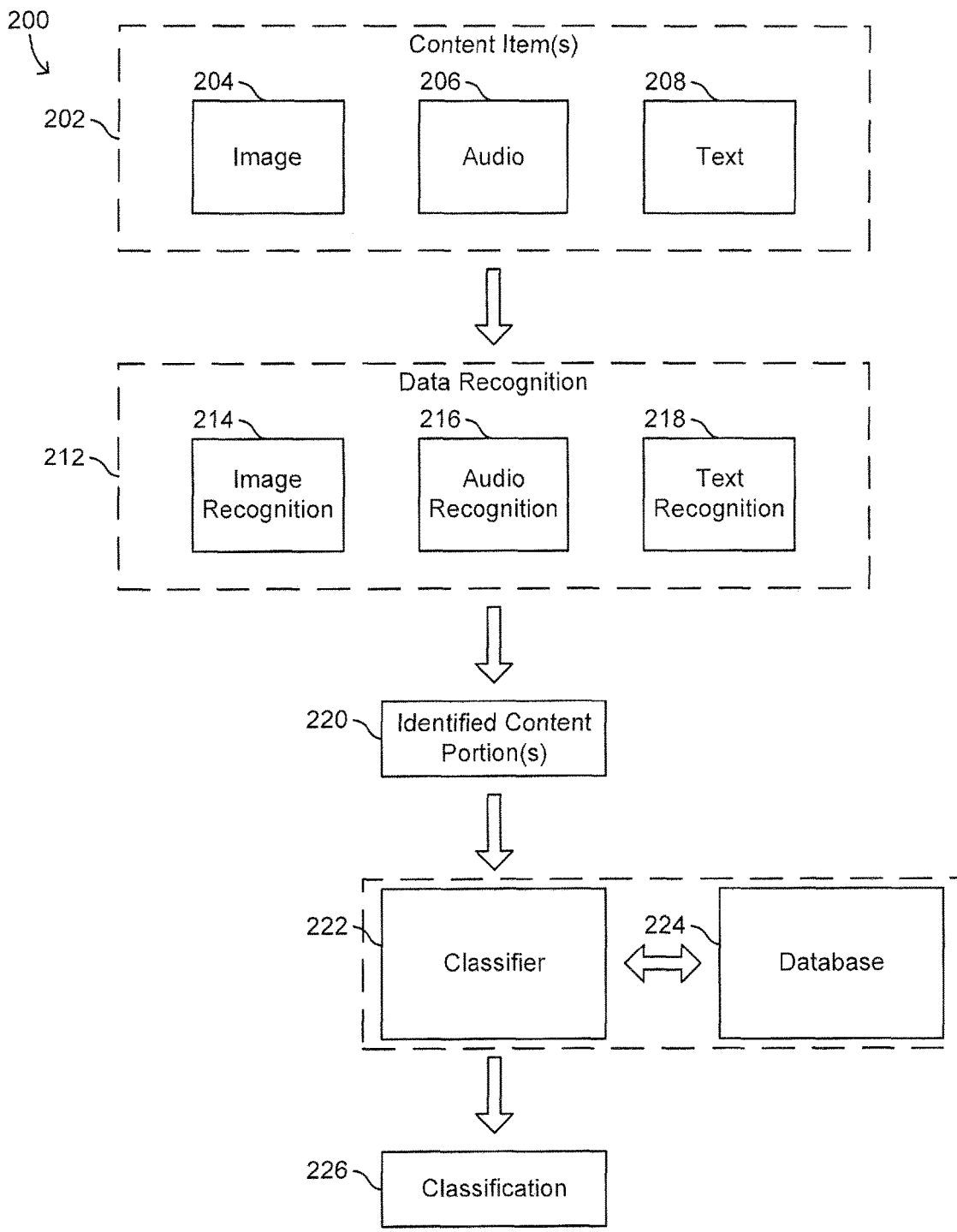
FIG. 2 illustrates an example system embodiment for content classification based on data recognition.

FIG. 2 illustrates an example system embodiment 200 for content classification based on data recognition. In FIG. 2, there can be one or more content items 202, such as an image(s) 204, audio 206, text 208, and/or video(s). In some instances, a video can be considered a combination of a set of images and audio. In some embodiments, the source(s) of the one or more content items 202 can be multiple websites or a single website. In some cases, the content items 202 can be from multiple applications (e.g., apps) or can be included in a single application. In some instances, the content items 202 can correspond to product information provided by one or more product content providers, such as retailers.

The example system embodiment 200 can include a data recognition module 212, which can be implemented using software and/or hardware. The data recognition module 212 can be configured to receive the content item(s) 202 (or data representative of the content item(s) 202). As shown in FIG. 2, for example, the data recognition module 212 can correspond to an image recognition module 214, an audio recognition module 216, a text recognition module 218, or any combination thereof. In some embodiments, the image recognition module 214 can be configured to perform an optical character recognition (OCR) process with respect to the content item(s) 202 (e.g., image(s) 204). For example, words or characters included in an image (e.g., 204) that are not yet machine-encoded can be converted into machine-encoded (i.e., machine-readable) text using the OCR process. In some embodiments, the image recognition module 214 can be configured to perform an object recognition process with respect to the content item(s) 202 (e.g., image(s) 204). For example, faces, products, music album covers, book covers, shapes, colors, and/or other objects included in an image (e.g., 204) can be recognized using the object recognition process. Also, it is important to note that, in some embodiments, an image 204 can include a picture, a video frame that is a part of a video, and/or an animation frame that is a part of an animation. For example, one or more frames can be extracted or sampled from the video and/or animation to make up the one or more images (e.g., 204).

As mentioned, the data recognition module 212 can include the audio recognition module 216. The audio recognition module 216 can receive an audio content item (e.g., 206) and attempt to recognize or identify one or more audio portions included in the audio content item. In one example, the audio recognition module 216 can be configured to perform a speech recognition process, such as a speech-to-text process, in attempt to recognize/identify one or more words included in the audio content item (e.g., 206). In another example, the audio recognition module 216 can be configured to perform a music recognition process such that a song (e.g., audio content item 206) can be identified.

Moreover, the data recognition module 212 can include the text recognition module 218. In some embodiments, the content item(s) 202 can include text 208. In some cases, the text 208 can be machine-readable (i.e., machine-encoded), such that the text recognition module 218 can perform a text crawling process in order to recognize or identify the text 208.

Continuing with FIG. 2, the identified content portion(s) 220, such as the recognized text/objects in a non-machine-readable image, the recognized audio, and/or the crawled text, etc., can be received at a classifier module 222. The classifier module 222 can attempt to classify or label the content item(s) 202 and/or the source(s) of the content item(s) 202. In some instances, a library or database 224 can store a set of already defined data (also sometimes referred to herein as "definitions"). The defined data can be already known, labeled, classified, preset, preconfigured, etc., to be associated with a particular classification or label. In some embodiments, the classifier 222 can compare the identified content portion(s) 220 against the defined data, in order to find one or more pieces of defined data that substantially match (i.e., match within an allowable deviation) the identified content portion(s) 220.

In one example, a first piece of defined text data can be known to correspond to text data representing a curse word. Thus, the first piece of defined text data can be labeled or classified as being associated with inappropriate content. In another example, a second piece of defined data can be known to correspond to audio data representing a spoken offensive term. As such, the second piece of defined text data can be labeled or classified as being associated with inappropriate content. It is further contemplated that a person of ordinary skill in the art would recognize other variations, examples, and/or embodiments of defined data (i.e., definitions) within the scope of the present disclosure.

Referring back to FIG. 2, a classification 226 can be made for the content item(s) 202 and/or for the source from which the content item(s) 202 was received. In some embodiments, the classification 226 can be made based on determining whether and/or which (if any) pieces of defined data substantially match the identified content portion(s) 220. For example, if the content item 202 includes a portion that matches a term known to be associated with inappropriate material, then the content item 202 and/or its source can be classified or labeled 226 as likely being inappropriate.

Figure 3:
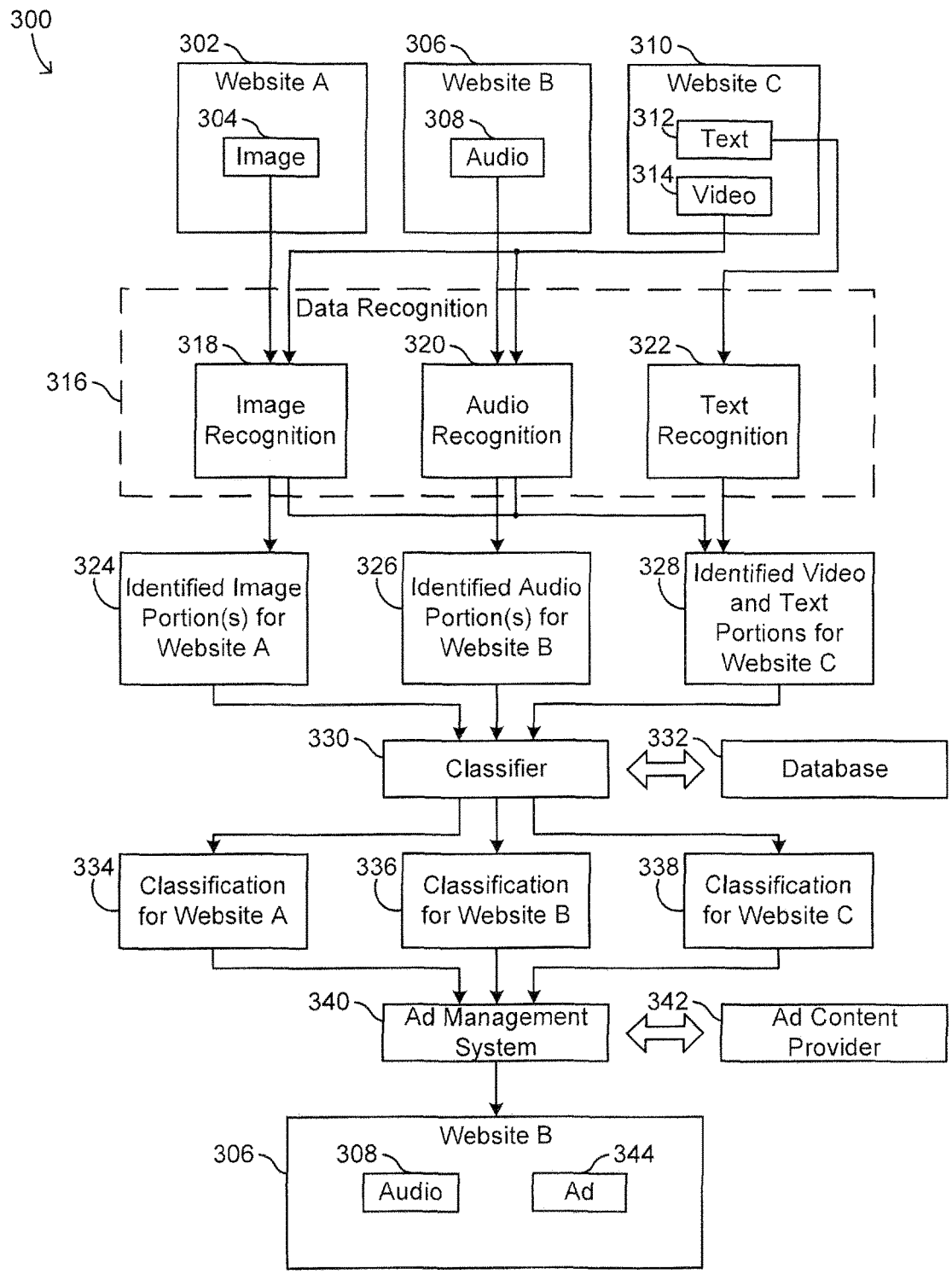
FIG. 3 illustrates an example system embodiment for content classification based on data recognition.

With reference now to FIG. 3, FIG. 3 illustrates an example system embodiment 300 for content classification based on data recognition. In one example, there can be various web contents, such as websites, as shown in FIG. 3. In some embodiments, content that is available on, configured for, or compatible/operable with the Internet or other networked environments can be considered web content. In the example of FIG. 3, content classification based on data recognition can be used by an advertisement management system to choose on which website(s) to display particular advertisements.

In the example of FIG. 3, Website A 302, Website B 306, and Website C 310, can be instances of web content. Website A 302 can include an image 304, Website B 306 can include audio content 308, and Website C 310 can include text 312 and video content 314. Each of the image 304, the audio 308, the text 312, and the video 314 can be an example of a content item. The content items (e.g., 304, 308, 312, 314) can be received (or obtained) by a data recognition module 316. The data recognition module 316 can include an image recognition module 318, an audio recognition module 320, and/or a text recognition module 322. The image 304 and video 314 (the video 314 being taken as one or more video image frames) can be received by the image recognition module 318. One or more image portion(s) for the image 304 can be identified (or recognized) 324 by the image recognition module 318. For example, non-machine-readable text included in the image 304 can be recognized using an optical character recognition (OCR) process implemented by the image recognition module 318. Moreover, for example, human faces, book covers, logos, products, signs, labels, and/or other objects can also be recognized using an object recognition process implemented by the image recognition module 318. Similarly, one or more image portions for the video 314 (video image frames) can be identified 328 by the image recognition module 318, while one or more audio portions for the video 314 (audio extracted/sampled from the video 314) can be identified 328 by the audio recognition module 320.

In addition, the audio 308 can be received by the audio recognition module 320. The audio recognition module 320 can perform an audio recognition process such as a speech recognition process (e.g., speech-to-text conversion) and/or a music recognition process. As such, one or more portions of the audio 308 can be recognized 326 by the audio recognition module 320. Likewise, the text 312 can be received by the text recognition module 322 and portions of the text 312 can be recognized 328. For example, the text recognition module 322 can perform text crawling to identify portions of the text 312, which can be in machine-readable form.

Continuing with the example of FIG. 3, the recognized portions of the content items for their respective websites can include identified image portion(s) 324 for Website A 302, identified audio portion(s) 326 for Website B 306, and identified video portion(s) and identified text portion(s) 328 for Website C 310. As shown in FIG. 3, the identified content portions can be received by a classifier unit 330.

In some embodiments, the classifier unit 330 can compare the identified portions (e.g., 324, 326, 328) with one or more definitions (i.e., defined data) stored in a database 332. Each definition can be known, pre-labeled, preconfigured, etc., to correspond to data representative of inappropriate material. In some embodiments, the one or more definitions can include textual representations of offensive words, audio representations of inappropriate vocalizations, visual representations of graphic content, and/or other data representations associated with inappropriate material. For example, the definitions can include (but is not limited to) a list of textual curse words, a set of audio recordings of vocalized curse terms, a set of audio recordings of inappropriate music, and/or a set of visual objects that depict explicit material.

Continuing with the example, the classifier 330 can determine a classification 334 for Website A 302 based on the classifying of the identified images portion(s) 324. The classifier 330 can determine a classification 336 for Website B 306 based on the classifying of the identified audio portion(s) 326. Further, the classifier 330 can determine a classification 338 for Website C 310 based on the classifying of the identified video and text portions 328.

In this example, image 304 can include curse words that are recognized by the OCR process implemented at the image recognition module 318. As such, the classifier 330 can classify Website A 302 (and the image 304) as likely being associated with curse words (i.e., inappropriate content). Moreover, in this example, using the text recognition module 322, the text 312 can be crawled and identified as being inclusive of portions of hate speech. As a result, the classifier 330 can classify Website C 310 (and the text 312) as likely being associated with hate speech (i.e., inappropriate material). In contrast, no inappropriate audio portions are identified in audio 308 and thus Website B 306 (and audio 308) can be classified as likely being suitable for the general public (i.e., appropriate material).

As mentioned previously, an advertisement management system 340 can utilize content classification to determine at which website(s) to display advertisements or other promotional material, which can be received from an advertisement content provider 342. Continuing with the example of FIG. 3, the advertisement management system 340 can receive the classifications 334, 336, and 338 for Websites A 302, B 306, and C 310, respectively. Since Website A 302 is classified as likely being associated with curse words and since Website C 310 is classified as likely being associated with hate speech, the advertisement management system 340 can decide not to display advertisements (e.g., advertisement 344 for a children's book) on Website A 302 and Website C 310. However, since Website B 306 has been classified as likely being suitable for the general public, the advertisement management system 340 can decide to display ad content 344 on Website B 306 in conjunction with the audio content 308.

Figure 4:
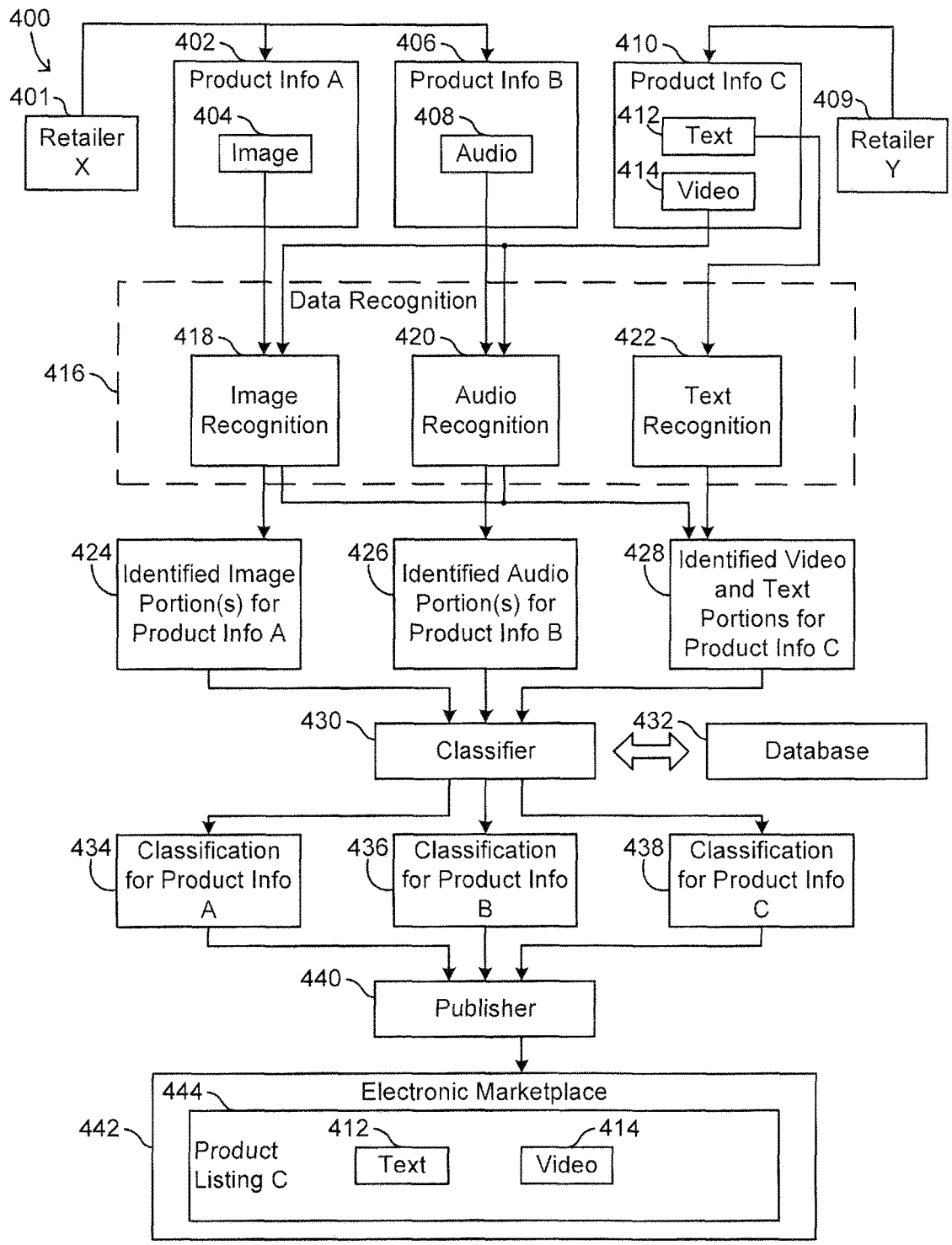
FIG. 4 illustrates an example system embodiment for content classification based on data recognition.

FIG. 4 illustrates an example system embodiment 400 for content classification based on data recognition. As shown in the example of FIG. 4, a publisher for an electronic marketplace can utilize content classification to determine whether or not to publish contents associated with products to be listed. In FIG. 4, there can be web content in the form of production information ("product info") for products purchasable via the electronic marketplace (e.g., online/Internet marketplace).

In this example, there can be one or more product information providers, such as retailer X 401 and retailer Y 409. Retailer X 401 can provide product info 402 for product A ("product info A 402") and product info 406 for product B ("product info B 406"). Retailer Y 409 can provide product info 410 for product C ("product info C 410"). In the example, product info A 402 can include an image 404 of a T-shirt (product A). Product info B 406 can include an audio clip 408 such as preview or sample clip for a song (product B). Product info C 410 can include text 412, such as product descriptions and/or user reviews for a wireless router (product C), as well as a video clip 414 describing how to install the wireless router (product C).

The image 404 for product A, the audio 408 for product B, and the text 412 and video 414 for product C can be received by a data recognition module 416, which can include an image recognition component 418, an audio recognition component 420, and/or a text recognition component 422. The data recognition module 416 can identify image portion(s) 424 for product info A 402, audio portion(s) 426 for product info B 406, and video and text portions 428 for product info C 410. The identified product info portions (e.g., 424, 426, 428) can be received by a classifier 430. The classifier 430 can communicate with a database 432 storing one or more defined data (i.e., known definitions) to find defined data that substantially match the identified product info portions.

As discussed previously, in this example, product A can be a T-shirt. The T-shirt can have offensive words written on the front of the shirt. The image 404 included in product info A 402 can show the front of the T-shirt with the offensive words. However, conventional approaches to automated content classification would typically overlook the offensive words on the front of the T-shirt in the image 404, and thus would not classify product A as being inappropriate content. In contrast, using the disclosed technology, the words in the image 404 of the T-shirt can be identified 424 by the image recognition component 418 (e.g., by using an OCR process). Then the classifier 430 can search the database 432 for one or more defined words that substantially match the identified words. The defined words that match the identified words can correspond to particular offensive terms and can thus indicate that the identified words also correspond to those particular offensive terms. Accordingly, the classifier 430 can classify 434 product A (and the image 404) as being inappropriate. The classification 434 of product A can be transmitted to a publisher 440, who can decide to deny publication of product A at the electronic marketplace 442.

Continuing with the example, product B can be a purchasable music file such as an MP3 song. The audio 408 can correspond to an audio sample of the song. The audio recognition component 420 can receive the audio 408, and use the database 432, which can include defined/known music clips, to match the audio sample. In this example, the song can be matched with music known to be from a politically incorrect artist. As such, the classifier 430 can classify 436 product B (and the audio 408) as being likely politically incorrect and inappropriate, and thus deny publication of product B at the electronic marketplace 442.

Regarding product C, product C can be a wireless router in this example. The text 412 for product C can be product descriptions and customer reviews of the wireless router. The video 414 can be an instructional video explaining how to set up the wireless router. The data recognition module 416 can receive the text 412 and video 414 for product C, and identify relevant video and text portions 428. However, in this example, the classifier 430 cannot find database definitions that substantially match the identified video and text portions 428. In other words, the video and text portions 428 are likely not associated with inappropriate material known to the database 432. Accordingly, classifier 430 can classify 438 product C as likely being appropriate for publication at the electronic marketplace 442. As shown in the example of FIG. 4, the publisher 440 can publish a product listing 444 for product C, including the text 412 and video 414, at the electronic marketplace 442.

Figure 5:
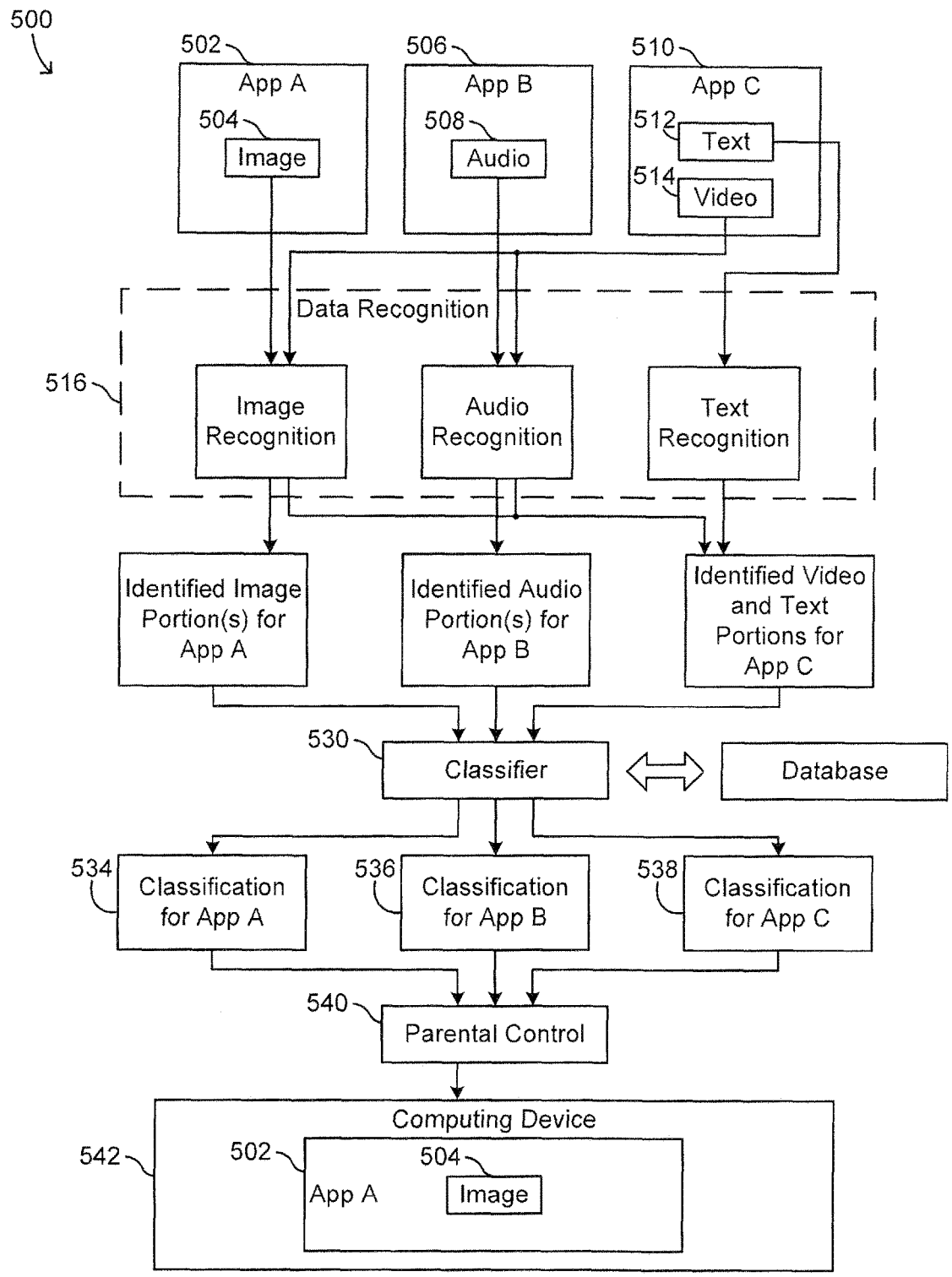
FIG. 5 illustrates an example system embodiment for content classification based on data recognition.

FIG. 5 illustrates an example system embodiment 500 for content classification based on data recognition. FIG. 5 shows, for example, how a parental control feature can utilize content classification to control which applications (i.e., apps) can be run on a computing device. In the example of FIG. 5, there can be various web contents in the form of applications, such as app A 502, app B 506, and app C 510. App A 502 can include an image content item 504. App B 506 can include an audio content item 508. App C 510 can include text 512 and video 514 content items.

The example system embodiment 500 of FIG. 5 can also include a data recognition module 516. The data recognition module 516 can receive the content items (504, 508, 512, 514) and identify at least portions of the content items. The identified content portions can be transmitted to a classifier 530 for classification. The classifier 430 can classify the apps based on each app's respective identified content portions. In this example of FIG. 5, app A 502 can be classified as likely being appropriate whereas apps B 506 and C 510 can be classified as likely being inappropriate.

Continuing with the example, the classifications 534, 536, and 538 for the apps 502, 506, and 508, respectively, can be utilized by a parental control feature 540. The parental control feature 540 can determine to allow a computing device 542 to operate (e.g., run, execute, open, etc.) app A 502 including the image 504, but deny operation of apps B 506 and C 510.

In some embodiments, the classification of content items can be utilized by a censorship feature. In some cases, the censorship feature can utilize the classification of content items to determine whether or not to censor, block, or filter out certain content items. In one example, the censorship feature can be based, at least in part, on at least one of a user specified preference, a preset preference, a government defined preference, a network carrier defined preference, a legal rule, or a manufacturer specified preference, etc.

In some embodiments, application developers can be provided an option to include specified code to enable their applications to work in conjunction with the disclosed technology. For example, app developers can be provided with software development kits (SDKs) which require the developers to include certain application programming interfaces (APIs) for getting and/or transmitting content items within their applications to the content classification technology of the present disclosure.

Figure 6A:
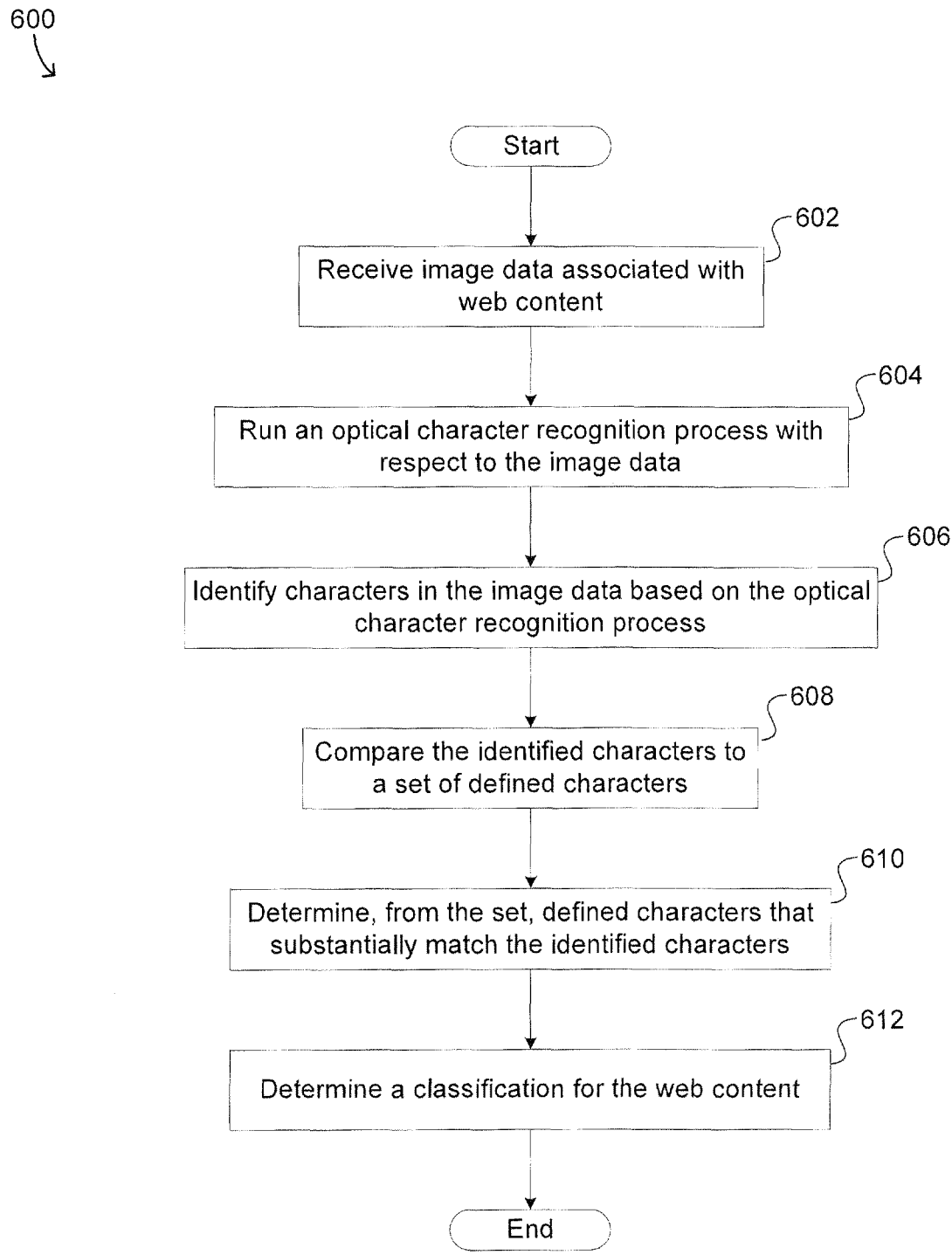
FIG. 6A illustrates an example method embodiment for content classification based on data recognition.

FIG. 6A illustrates an example method embodiment 600 for content classification based on data recognition. It should be understood that there can be additional, fewer, or alternative steps performed in similar or alternative orders, or in parallel, within the scope of the various embodiments unless otherwise stated. The example method embodiment 600 can start with receiving image data associated with web content, at step 602. In some cases, the web content can correspond to content from a website or webpage. At step 604, the example method 600 can run an optical character recognition (OCR) process, or other such text recognition process, with respect to the image data. Step 606 can include identifying one or more characters included in the image data. The identifying of the one or more characters can be based, at least in part, on the running of the optical character recognition process with respect to the image data.

The example method 600 can compare the one or more characters to a set of defined characters, at step 608. Step 610 can include determining, from the set, one or more defined characters that match the one or more characters within an allowable deviation. The one or more defined characters can be known, preset, pre-labeled, etc., to be associated with an appropriate word or term.

The method 600 can continue, at step 612, by determining a classification for at least a portion of the web content (e.g., website, webpage, etc.) based, at least in part, on the determining of the one or more defined characters that match the one or more characters within the allowable deviation. For example, since the one or more defined characters are known to be associated with inappropriate language, and since the one or more defined characters (substantially) match the one or more characters, then the one or more characters can be classified as likely being inappropriate as well.

Figure 6B:
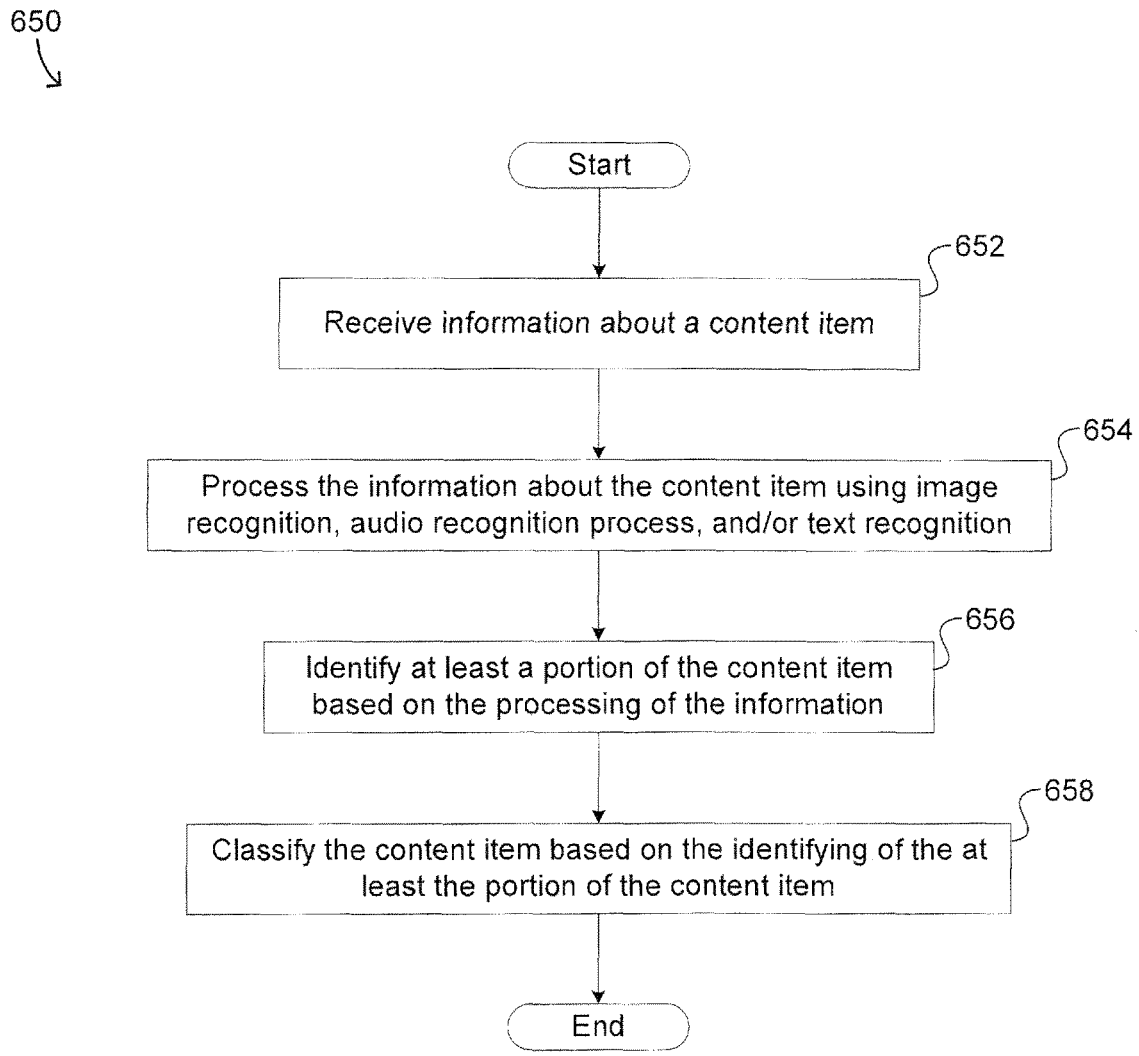
FIG. 6B illustrates an example method embodiment for content classification based on data recognition.

FIG. 6B illustrates an example method embodiment 650 for content classification based on data recognition. Again, it should be understood that there can be additional, fewer, or alternative steps performed in similar or alternative orders, or in parallel, within the scope of the various embodiments unless otherwise stated. At step 652, the example method embodiment 650 can receive information about a content item. In some embodiments, the content item can include at least one of an image, an audio, or text. In some embodiments, an image can include a still frame that is part of a video. In some embodiments, an audio can include sound extracted from a video.

At step 654, the example method 650 can process the information about the content item using at least one of an image recognition process, an audio recognition process, or a text recognition process. Step 656 can include identifying at least a portion of the content item. The identifying can be based, at least in part, on the processing of the information about the content item. Then the method 650 can classify the content item based, at least in part, on the identifying of the at least the portion of the content item, at step 658.

In some embodiments, the content item can correspond to information to be published at an editorial system. The editorial system can be associated with a publisher that accepts content items and publishes them. Based on the classification of the content item (e.g., the infatuation to be published), the editorial system and/or publisher can decide whether or not to publish the content item. Moreover, in some embodiments, the content item can correspond to information to be broadcasted by a broadcast system, such as a television, podcast, or radio system, Based on the classification of the content item, the broadcast system can decide whether or not to provide/present a broadcast including the content item.

In some embodiments, the classification of content based on data recognition can be implemented at one or more networked computing platforms. In some embodiments, the classification of content based on data recognition can be implemented at a computing device, such as at a browser or other application of the computing device. Moreover, in some embodiments, a screenshot of a web page, of product information, of an application, or of some other content can be utilized as a content item for recognition and classification.

In some embodiments, content classification based on data recognition can be customized and/or personalized for a user. In one example, the user can choose which contents or type of contents to filter out. In another example, the disclosed technology can learn over time which contents or content-types the user typically does not desire to access.

In some embodiments, content classification based on data recognition can be one of multiple review/classification processes. For example, automated content classification based on data recognition can be used to set flags, such that contents that are flagged by the automated classification require further manual review.

In some embodiments, a relevancy score or an appropriateness score for the content item relative to the advertising content can be determined. The relevancy score can indicate how relevant the advertising content is with respect to the content item. The appropriateness score can indicate whether or not it would be appropriate to display the advertising content in conjunction with the content item. Moreover, in some embodiments, the advertising content can be displayed in conjunction with the content item when the relevancy score at least meets a relevancy threshold or when the appropriateness score at least meets an appropriateness threshold.

Various embodiments of the present disclosure can also enable weighting and/or prioritizing of the content items. In one example, a larger (e.g., in resolution) image on a website can be weighted more significantly or be ranked higher than a smaller image on the website. In another example, a video content item describing a product can be weighted more significantly or be ranked higher than an image content item of the product. In a further example, text that is bolded, underlined, highlighted, or otherwise emphasized can take priority over other text having less emphasis. In some embodiments, the weighting and/or prioritizing can enable web content with multiple content items to be classified efficiently without significantly sacrificing accuracy.

It is also contemplated that a person having ordinary skill in the art would recognize that there can be many variations, different implementations, use cases, and/or other embodiments consistent with the scope of the present disclosure.

Figure 7:
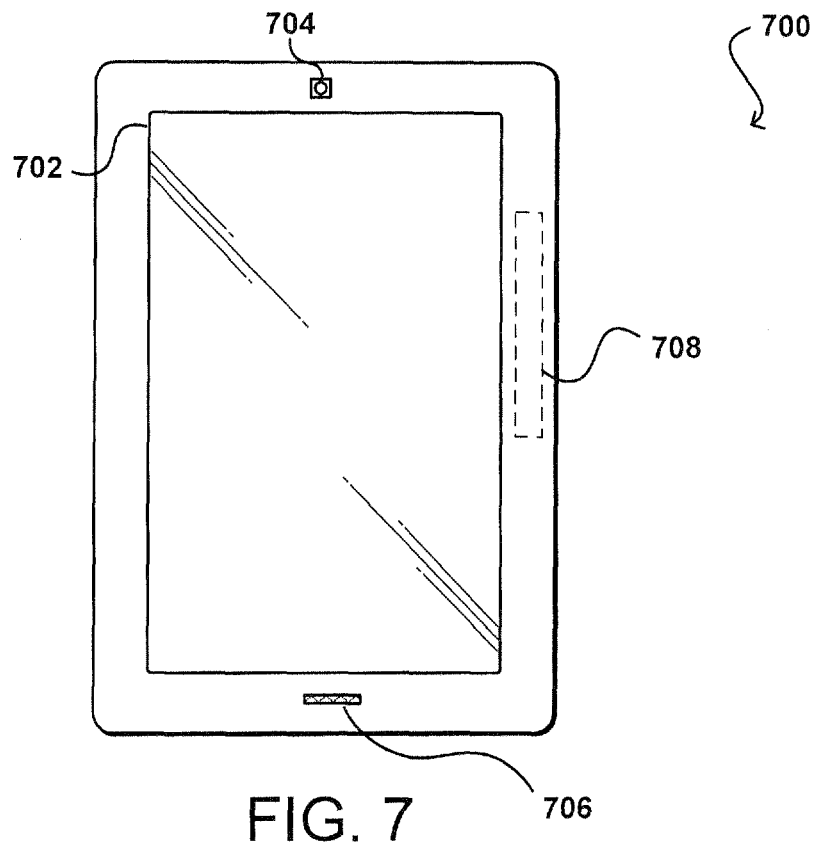
FIG. 7 illustrates an example device that can be used to implement aspects of the various embodiments.

FIG. 7 illustrates an example electronic user device 700 that can be used in accordance with various embodiments. In some embodiments, the example electronic user device 700 can correspond to the client computing device 102 of FIG. 1. Although a portable computing device (e.g., an electronic book reader or tablet computer) is shown in FIG. 7, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In some embodiments, a computing device can be an analog device, such as a device that can perform signal processing using operational amplifiers. In this example, the computing device 700 has a display screen 702 on the front side, which under normal operation will display information to a user facing the display screen (e.g., on the same side of the computing device as the display screen). The computing device in this example includes at least one camera 704 or other imaging element for capturing still or video image information over at least a field of view of the at least one camera. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video.

The example computing device 700 also includes at least one microphone 706 or other audio capture device capable of capturing audio data, such as words or commands spoken by a user of the device. In this example, a microphone 706 is placed on the same side of the device as the display screen 702, such that the microphone will typically be better able to capture words spoken by a user of the device. In at least some embodiments, a microphone can be a directional microphone that captures sound information from substantially directly in front of the microphone, and picks up only a limited amount of sound from other directions. It should be understood that a microphone might be located on any appropriate surface of any region, face, or edge of the device in different embodiments, and that multiple microphones can be used for audio recording and filtering purposes, etc.

The example computing device 700 also includes at least one orientation sensor 708, such as a position and/or movement-determining element. Such a sensor can include, for example, an accelerometer or gyroscope operable to detect an orientation and/or change in orientation of the computing device, as well as small movements of the device. An orientation sensor also can include an electronic or digital compass, which can indicate a direction (e.g., north or south) in which the device is determined to be pointing (e.g., with respect to a primary axis or other such aspect). An orientation sensor also can include or comprise a global positioning system (GPS) or similar positioning element operable to determine relative coordinates for a position of the computing device, as well as information about relatively large movements of the device. Various embodiments can include one or more such elements in any appropriate combination. As should be understood, the algorithms or mechanisms used for determining relative position, orientation, and/or movement can depend at least in part upon the selection of elements available to the device.

Figure 8:
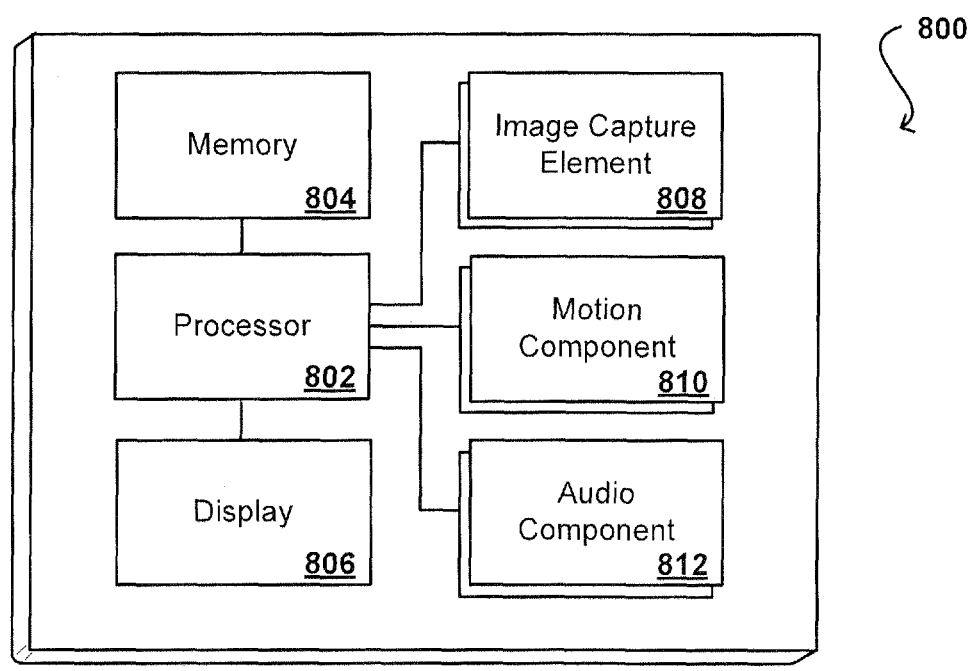
FIG. 8 illustrates example components of a client device such as that illustrated in FIG. 7.

FIG. 8 illustrates a logical arrangement of a set of general components of an example computing device 800 such as the device 700 described with respect to FIG. 7. In this example, the device includes a processor 802 for executing instructions that can be stored in a memory device or element 804. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. The device typically will include some type of display element 806, such as a touch screen or liquid crystal display (LCD), although devices such as portable media players might convey information via other means, such as through audio speakers. As discussed, the device in many embodiments will include at least one image capture element 808 such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device similarly includes at least one audio capture component 812, such as a mono or stereo microphone or microphone array, operable to capture audio information from at least one primary direction. A microphone can be a uni- or omni-directional microphone as known for such devices.

In some embodiments, the computing device 800 of FIG. 8 can include one or more communication elements (not shown), such as a Bluetooth, RF, wired, or wireless communication system. The device in many embodiments can communicate with a network, such as the Internet, and may be able to communicate with other such devices. In some embodiments the device can include at least one additional input device able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 800 also can include at least one orientation or motion sensor 810. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 802, whereby the device can perform any of a number of actions described or suggested herein.

As an example, a computing device such as that described with respect to NG. 7 can capture and/or track various information for a user over time. This information can include any appropriate information, such as location, actions (e.g., sending a message or creating a document), user behavior (e.g., how often a user performs a task, the amount of time a user spends on a task, the ways in which a user navigates through an interface, etc.), user preferences (e.g., how a user likes to receive information), open applications, submitted requests, received calls, and the like. As discussed above, the information can be stored in such a way that the information is linked or otherwise associated whereby a user can access the information using any appropriate dimension or group of dimensions.

Figure 9:
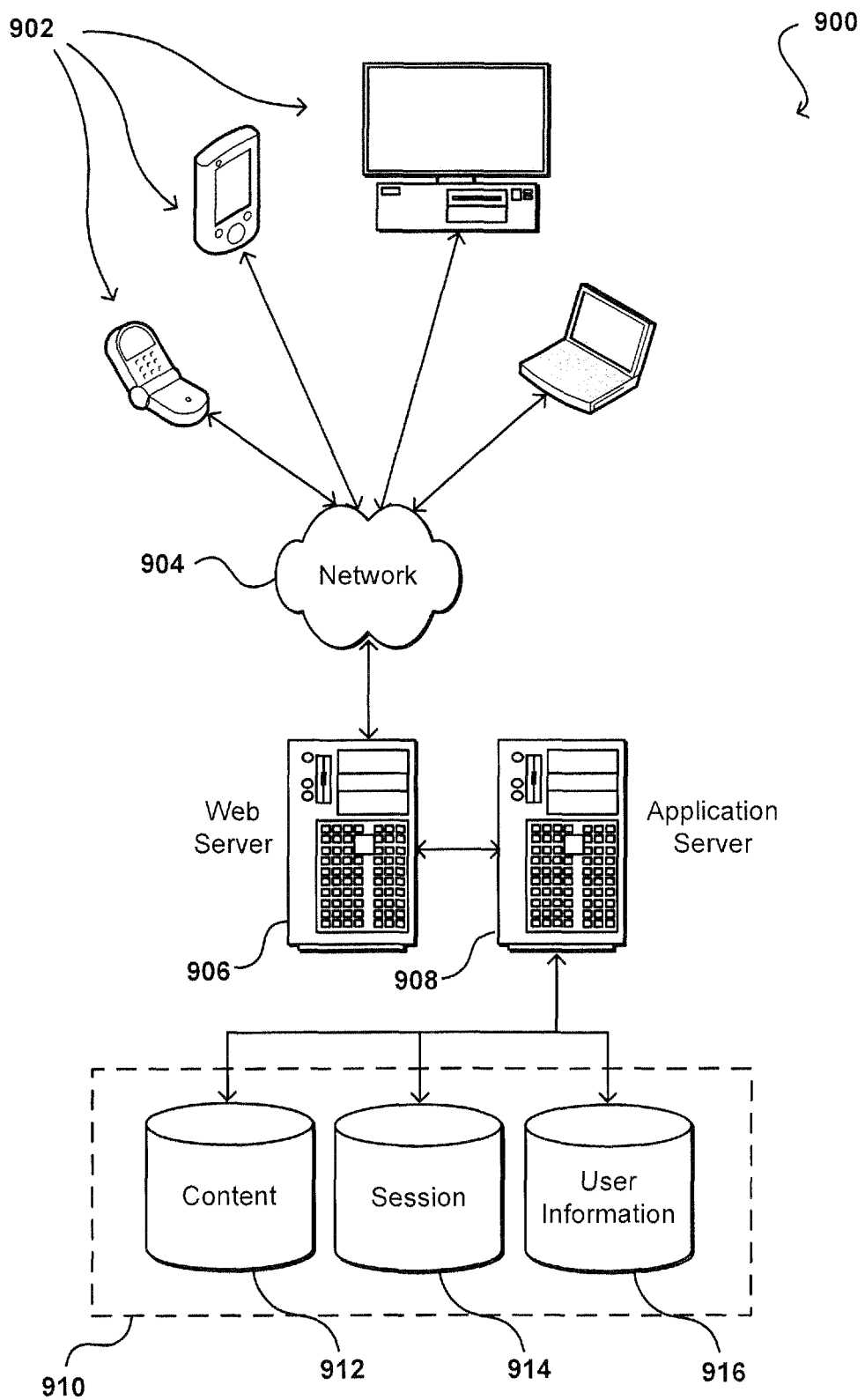
FIG. 9 illustrates an environment in which various embodiments can be implemented.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of element. In this case, the data store might access the user information to verify the identity of the user and can access the catalog detail information to obtain information about elements of that type. The information can then be returned to the user, such as in a results listing on a Web page that the user is able to view via a browser on the user device 902. Information for a particular element of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A non-transitory computer-readable storage medium including instructions, the instructions when executed by a processor of a computing system causing the computing system to:

receive image data associated with web content;

analyze the image data using an optical character recognition process;

determine an image weight based on a resolution of the image data;

identify one or more characters included in the image data based, at least in part, on the analyzing of the image data using the optical character recognition process;

analyze the one or more characters to detect one of text bolding or text highlighting applied to the one or more characters;

assign a weight to each of the one or more characters based at least in part on the text bolding or text highlighting, wherein a character including text bolding or text highlighting is weighted higher than a character without the text bolding or text highlighting;

compare the one or more characters to a set of defined words, each defined word in the set being associated with inappropriate material;

determine, from the set, one or more defined words that match the one or more characters within an allowable deviation;

determine a classification for the web content based, at least in part, on the determining of the one or more defined words that match the one or more characters within the allowable deviation, the image weight, and the weight assigned to the one or more characters that match the one or more defined words, the classification indicating that the web content is associated with inappropriate material;

determine a relevancy score and an appropriateness score for an advertisement with respect to the web content, the relevancy score indicating how relevant the advertisement is to the web content, and the appropriateness score indicating whether it is appropriate to display the advertisement in conjunction with the web content; and restrict the advertisement from being displayed in conjunction with the web content when the appropriateness score does not meet an appropriateness threshold.

2. The non-transitory computer readable storage medium of claim 1, wherein the instructions cause the computing system to further:

receive audio data associated with the web content;

analyze the audio data using a speech recognition process;

identify one or more vocalizations included in the audio data based, at least in part, on the analyzing of the audio data using the speech recognition process;

compare the one or more vocalizations to a set of defined audio portions, each defined audio portion in the set being associated with inappropriate material; and determine, from the set, one or more defined audio portions that match the one or more vocalizations within an allowable audio deviation, wherein the classification for the web content is determined based, at least in part, further on the determining of the one or more defined audio portions that match the one or more vocalizations within the allowable audio deviation.

3. The non-transitory computer readable storage medium of claim 1, wherein the image data corresponds to at least one of a picture, a video frame, an animation frame, or a screenshot.

4. A computer-implemented method comprising:

receiving information about a content item including an image and text;

analyzing the image with an image recognition process, yielding an image analysis;

assigning a weight to the image based on a resolution of the image, wherein a higher resolution image is weighted higher than a lower resolution image;

analyzing the text, yielding a text analysis;

assigning a weight to the text based at least in part on whether the text has text bolding or text highlighting, wherein text that includes text bolding or text highlighting is weighted higher than text without the text bolding or text highlighting;

determining a classification for the content item based, at least in part, on the image analysis, the image weight, the text analysis, and the text weight;

determining whether or not to provide additional information associated with the content item based, at least in part, on the classification for the content item, the additional information including advertising content;

determining a relevancy score and an appropriateness score for the advertising content with respect to the content item, the relevancy score indicating how relevant the advertising content is to the content item, and the appropriateness score indicating whether it is appropriate to display the advertising content in conjunction with the content item; and displaying the advertising content in conjunction with the content item when at least the appropriateness score meets an appropriateness threshold.

5. The computer-implemented method of claim 4, wherein the image recognition process includes at least one of an optical character recognition process or an object recognition process.

6. The computer-implemented method of claim 4, wherein the determining of the classification for the content item further comprises:

comparing at least a portion of the content item to a set of definitions to determine one or more definitions that match the at least the portion of the content item within an allowable deviation, wherein the portion of the content item comprises at least one of the image or the text; and classifying the content item based, at least in part, on the one or more definitions that match the at least the portion of the content item within the allowable deviation.

7. The computer-implemented method of claim 6, wherein the one or more definitions are associated with offensive language, obscene material, graphic content, or content for mature audiences, and wherein the content item is classified as being inappropriate.

8. The computer-implemented method of claim 4, wherein the determining of the classification for the content item further comprises:

flagging the content item to be further reviewed manually.

9. The computer-implemented method of claim 4, wherein the additional information includes advertising content received from an advertisement provider.

10. The computer-implemented method of claim 9, comprising:

displaying the advertising content in conjunction with the content item when the relevancy score meets a relevancy threshold.

11. The computer-implemented method of claim 4, wherein the content item corresponds to information to be published at an editorial system, and wherein the additional information corresponds to a publication of the content item by a publisher associated with the editorial system.

12. The computer-implemented method of claim 4, wherein the content item corresponds to a product or product information associated with the product to be published at an electronic marketplace, and wherein the additional information corresponds to a product listing for the product.

13. The computer-implemented method of claim 4, further comprising:
receiving a user request to access the additional information associated with the content item, wherein the determining of whether or not to provide the additional information further comprises determining whether to allow or deny the user request.

14. The computer-implemented method of claim 13, wherein the determining of whether to allow or deny the user request is associated with a parental control feature or a censorship feature.

15. The computer-implemented method of claim 4, wherein the content item is associated with at least one of a website, an application, a product or product information to be published at an electronic marketplace, an editorial system, or a broadcast.

16. The computer-implemented method of claim 4, wherein the image corresponds to at least one of a picture, a video frame, an animation frame, or a screenshot, wherein the audio corresponds to at least one of a vocalization or music, and wherein the text corresponds to at least one character or symbol.

17. A computing device comprising:
at least one processor; and
a memory device including instructions that, when executed by the at least one processor, cause the computing device to:
receive information about a content item including an image and text;
analyzing the image with an image recognition process, yielding an image analysis;
assigning a weight to the image based on a resolution of the image, wherein a higher resolution image is weighted higher than a lower resolution image;
analyzing the text, yielding a text analysis;
assigning a weight to the text based at least in part on whether the text has text bolding or text highlighting, wherein text that includes text bolding or text highlighting is weighted higher than text without the text bolding or text highlighting;
determine a classification for the content item based, at least in part, on the image analysis, the image weight, the text analysis, and the text weight;
determine whether or not to provide additional information associated with the content item based, at least in part, on the classification for the content item, the additional information including advertising content;
determine a relevancy score and an appropriateness score for the advertising content with respect to the content item, the relevancy score indicating how relevant the advertising content is to the content item, and the appropriateness score indicating whether it is appropriate to display the advertising content in conjunction with the content item; and
display the advertising content in conjunction with the content item when at least the appropriateness score meets an appropriateness threshold.

18. The computing device of claim 17, wherein the instructions cause the computing device to further:
assign a first priority score for the content item based, at least in part, on the information about the content item;
receive information about another content item;
assign a second priority score for the other content item based, at least in part, on the information about the other content item; and
determine, prior to the processing of the information about the content item, that the first priority score is higher in rank than the second priority score.

19. The computing device of claim 18, wherein the content item includes a first image having a first resolution, wherein the other content item includes a second image having a second resolution, and wherein the first resolution is larger than the second resolution.

20. The computing device of claim 17, wherein the instructions cause the computing device to further receive user input from a user of the computing device, wherein the determining of the classification for the content item is further based, at least in part, on the received user input.

* * * * *